United States Patent
Kirschnick

(10) Patent No.: US 10,685,288 B2
(45) Date of Patent: Jun. 16, 2020

(54) CONFIGURATION OF MALFUNCTION PREDICTION FOR COMPONENTS AND UNITS OF TECHNICAL ENTITIES

(71) Applicant: Cassantec AG, Zurich (CH)

(72) Inventor: Frank Kirschnick, Adliswil (CH)

(73) Assignee: CASSANTEC AG, Zurich (CH)

(*) Notice: Subject to any disclaimer, the term of this patent is extended or adjusted under 35 U.S.C. 154(b) by 43 days.

(21) Appl. No.: 15/504,717

(22) PCT Filed: Aug. 3, 2015

(86) PCT No.: PCT/EP2015/067851
§ 371 (c)(1),
(2) Date: Feb. 17, 2017

(87) PCT Pub. No.: WO2016/026681
PCT Pub. Date: Feb. 25, 2016

(65) Prior Publication Data
US 2017/0236064 A1     Aug. 17, 2017

(30) Foreign Application Priority Data
Aug. 20, 2014  (CH) ........................... 1252/14

(51) Int. Cl.
G06Q 10/06     (2012.01)
G06N 7/00      (2006.01)
(Continued)

(52) U.S. Cl.
CPC ............. G06N 5/04 (2013.01); F01D 21/003 (2013.01); F02D 41/22 (2013.01); G06Q 10/06 (2013.01); F05D 2220/32 (2013.01)

(58) Field of Classification Search
USPC ........................................................ 702/181
See application file for complete search history.

(56) References Cited

U.S. PATENT DOCUMENTS 5,014,220 A    5/1991  McMann et al.
8,200,600 B2   6/2012  Rosenstein et al.
(Continued)

FOREIGN PATENT DOCUMENTS

DE    10161633 A1   8/2002
DE    10161655 A1   1/2003
(Continued)

OTHER PUBLICATIONS

International Search Report for PCT/EP2015/067851 dated Sep. 30, 2015.

*Primary Examiner* — Leslie J. Evanisko
(74) *Attorney, Agent, or Firm* — Pearne & Gordon LLP

(57) ABSTRACT

Method for configuring an apparatus or method for prediction of a malfunction of a unit, includes providing components of the unit; providing single malfunctions for each component; providing probabilities for the single malfunctions of each component; providing a parameter of each component for each single malfunction of this component; dividing each parameter into discrete value states; providing values of the parameters; determining a transition matrix for each parameter on the basis of the measurements of this parameter, wherein the transition matrix includes for the plurality of discrete value states of each parameter the probabilities to switch from one of the discrete value states to another of the discrete value states within a certain time period; determining the probabilities of the discrete value states on the basis of the measurements of the parameters; and providing the conditional probabilities of the discrete value states given the corresponding single malfunction.

16 Claims, 8 Drawing Sheets

(51) Int. Cl.
*G06N 5/04* (2006.01)
*F01D 21/00* (2006.01)
*F02D 41/22* (2006.01)

(56) References Cited

U.S. PATENT DOCUMENTS

| | | |
|---|---|---|
| 8,275,642 B2 | 9/2012 | Chan et al. |
| 2003/0005486 A1* | 1/2003 | Ridolfo .............. G05B 23/0272 800/288 |
| 2003/0220719 A1 | 11/2003 | Jiang et al. |
| 2006/0064291 A1 | 3/2006 | Pattipatti et al. |
| 2010/0002307 A1 | 1/2010 | Yamamura |
| 2010/0094788 A1 | 4/2010 | Schafer et al. |
| 2011/0096593 A1 | 4/2011 | Ranjan et al. |

FOREIGN PATENT DOCUMENTS

| | | |
|---|---|---|
| DE | 102010051133 A1 | 6/2011 |
| EP | 2112568 A2 | 10/2009 |
| EP | 2141560 A2 | 1/2010 |
| EP | 2437034 A2 | 4/2012 |
| WO | 0026786 A1 | 5/2000 |

* cited by examiner

| Index | Malfunction | Data source | 08. Feb | 15. Feb | 22. Feb | 29. Feb | 7. Mar | 14. Mar | 21. Mar | 28. Mar | 04. Apr | 11. Apr |
|---|---|---|---|---|---|---|---|---|---|---|---|---|
| M1 | Rotor Rub | V1, V2, V3, V5 | 0,0000% | 2,0000% | 3,0000% | 3,8000% | 4,5000% | 5,0000% | 5,3000% | 5,5000% | 5,6000% | 5,6600% |
| M2 | Bearing Looseness | V1, V2, V3, V5 | 0,0000% | 0,0001% | 0,0001% | 0,0001% | 0,0001% | 0,0001% | 0,0001% | 0,0001% | 0,0001% | 0,0001% |
| M3 | Unbalance | V1, V2, V3, V5 | 0,0000% | 0,0001% | 0,0001% | 0,0001% | 0,0001% | 0,0001% | 0,0001% | 0,0001% | 0,0001% | 0,0001% |
| M4 | Lubricant-related instability | V1, V2, V3, V5 | 0,0020% | 0,0030% | 0,0037% | 0,0042% | 0,0046% | 0,0049% | 0,0051% | 0,0052% | 0,0053% | 0,0054% |
| M5 | Thrust Bearing Failure | V4 | 0,0000% | 0,0200% | 0,0300% | 0,0380% | 0,0450% | 0,0500% | 0,0530% | 0,0550% | 0,0560% | 0,0566% |
| M6 | Metal Wear | L1, L2, L3, L4 | 0,0200% | 0,0300% | 0,0370% | 0,0420% | 0,0460% | 0,0490% | 0,0510% | 0,0520% | 0,0530% | 0,0535% |
| M7 | Particulate Contamination | L1, L2, L3, L4 | 0,0000% | 0,0200% | 0,0300% | 0,0380% | 0,0450% | 0,0500% | 0,0530% | 0,0550% | 0,0560% | 0,0566% |
| M8 | Liquid Contamination | L1, L2, L3, L4 | 0,0000% | 1,0000% | 1,5000% | 1,9000% | 2,2500% | 2,5000% | 2,6500% | 2,7500% | 2,8000% | 2,8300% |
| M9 | Additive-related Malfunction | L1, L2, L3, L4 | 0,0001% | 0,0001% | 0,0001% | 0,0001% | 0,0001% | 0,0001% | 0,0001% | 0,0001% | 0,0001% | 0,0001% |
| M10 | Lubricant Degradation | L1, L2, L3, L4 | 0,0000% | 0,0001% | 0,0002% | 0,0003% | 0,0004% | 0,0005% | 0,0006% | 0,0007% | 0,0008% | 0,0009% |
| M11 | Thermal Malfunction | T1, T2, T3 | | | | | | | | | | |
| M12 | MW-MVAr Disproportion | E1 | | | | | | | | | | |
| | | Total risk | 0,0221% | 3,0512% | 4,5517% | 5,7436% | 6,7806% | 7,5182% | 7,9597% | 8,2532% | 8,4004% | 8,4885% |

Fig. 6a

| Index | Component | Subcomponent | 08. Feb | 15. Feb | 22. Feb | 29. Feb | 7. Mar | 14. Mar | 21. Mar | 28. Mar | 04. Apr | 11. Apr |
|---|---|---|---|---|---|---|---|---|---|---|---|---|
| 1 | Boiler | Tubes, Drums | 0,6000% | 0,9000% | 1,1100% | 1,2600% | 1,3800% | 1,4700% | 1,5300% | 1,5600% | 1,5900% | 1,6050% |
| 2 | Coal Mill | Motor, Gearbox | 0,0001% | 0,0001% | 0,0001% | 0,0001% | 0,0001% | 0,0001% | 0,0001% | 0,0001% | 0,0001% | 0,0001% |
| 3 | ID Fan | Motor, Bearings | 0,0001% | 0,0001% | 0,0001% | 0,0001% | 0,0001% | 0,0001% | 0,0001% | 0,0001% | 0,0001% | 0,0001% |
| 4 | FD Fan | Motor, Bearings | 0,0001% | 0,0001% | 0,0001% | 0,0001% | 0,0001% | 0,0001% | 0,0001% | 0,0001% | 0,0001% | 0,0001% |
| 5 | Boiler Feed Pump | Bearings, Seals | 0,0001% | 0,0001% | 0,0001% | 0,0001% | 0,0001% | 0,0001% | 0,0001% | 0,0001% | 0,0001% | 0,0001% |
| 6 | Condensate Pump | Bearings, Seals | 0,0001% | 0,0001% | 0,0001% | 0,0001% | 0,0001% | 0,0001% | 0,0001% | 0,0001% | 0,0001% | 0,0001% |
| 7 | Steam Turbine & Generator | Bearings, Rotor | 0,0221% | 3,0512% | 4,5517% | 5,7436% | 6,7806% | 7,5182% | 7,9597% | 8,2532% | 8,4004% | 8,4885% |
| 8 | Transformer | Insulation | 0,0001% | 0,0001% | 0,0001% | 0,0001% | 0,0001% | 0,0001% | 0,0001% | 0,0001% | 0,0001% | 0,0001% |
| | | Total risk | 0,6226% | 3,9243% | 5,6117% | 6,9318% | 8,0676% | 8,8782% | 9,3685% | 9,6850% | 9,8574% | 9,9578% |

Fig. 6b

| Index | Title | Relative Likelihood | Relative Impact |
|---|---|---|---|
| M1.1 | Rotor Rub | 0,3 | 0,85 |
| M1.2 | Bearing Looseness | 0,6 | 0,83 |
| M1.3 | Unbalance | 0,5 | 0,81 |
| M1.4 | Lubricant-related instability | 0,4 | 0,7 |
| M1.5 | Thrust Bearing Failure | 0,2 | 0,3 |
| M1.6 | Metal Wear | 0,2 | 0,4 |
| M1.7 | Particulate Contamination | 0,1 | 0,1 |
| M1.8 | Liquid Contamination | 0,3 | 0,1 |
| M1.9 | Additive-related Malfunction | 0,4 | 0,1 |
| M1.10 | Lubricant Degradation | 0,1 | 0,1 |
| M1.11 | Thermal Malfunction | 0,2 | 0,1 |
| M1.12 | MW-MVAr Disproportion | 0,3 | 0,3 |

Fig. 8

| | Parameter value level | M1.1 $P(C|M_{11})$ | M1.2 $P(C|M_{12})$ | M1.3 $P(C|M_{13})$ |
|---|---|---|---|---|
| P1.1 | red | 0% | 0% | 0% |
| | orange | 0% | 0% | 30% |
| | yellow | 0% | 0% | 40% |
| | green | 100% | 100% | 30% |
| P1.2 | red | 5% | 5% | 0% |
| | orange | 40% | 10% | 0% |
| | yellow | 50% | 10% | 0% |
| | green | 5% | 75% | 100% |

Fig. 9

CONFIGURATION OF MALFUNCTION PREDICTION FOR COMPONENTS AND UNITS OF TECHNICAL ENTITIES

FIELD OF THE INVENTION

The present invention addresses the prediction of malfunctions of components, units, and fleets of technical entities. The invention is in particular applicable to industrial asset management, but also to other fields.

DESCRIPTION OF RELATED ART

For large industrial assets—such as power plants, manufacturing plants, mining sites, oil and gas production facilities—or for transportation units such as planes, trains, or trucks, a single malfunction can have a huge impact on the entire unit. The malfunction of a single component can lead to a shutdown of the entire unit, or even fleet or network of assets. The malfunction of a single component of a plane—for instance—can negatively influence the transportation network, because one delayed or cancelled flight may cause numerous problems for subsequent flights. There is therefore a strong interest in avoiding malfunctions in such highly connected systems where operability may depend on a single component. Industrial assets are typically subject to technical inspections and checks within scheduled maintenance periods. In the context of scheduled maintenance, worn parts are normally replaced more frequently than necessary to forestall malfunctions.

In order to extend maintenance and part replacement intervals while at the same time decreasing the likelihood of malfunction, it is currently possible to develop reliability models for functional units like plants in order to ascertain the reliability of the plant, as described in US2003220719. However, the models are highly complex and are not suitable for malfunction predictions over an extended, explicit future time horizon, a significant period prior to their occurrence. In addition, the reliability models relate to each specific machine. Consequently the models differ completely between two components, like a gas turbine and a current transformer, both of which are present in a power plant. Therefore, for bigger units (plants) with a large variety of components (machines), reliability models become highly complex and computationally inefficient. In addition, for each type of component, machine, etc., a new reliability model must be created, a cumbersome and expensive process. US2006064291, EP2437034, US201002307 and U.S. Pat. No. 8,275,642 disclose further parametrical models specific to each type of machine.

DE102010051133, U.S. Pat. No. 5,014,220, EP2141560, EP2112568, US2010094788, DE10161633, DE10161655, WO0026786, US2011096593 and U.S. Pat. No. 8,200,600 disclose the use of Markov models for predicting certain parameter values or states of the components. These models have the advantage that they can be used for a variety of component types. However, they have the disadvantage that they can only predict a single future component state or parameter value. They do not predict random events or processes, such as malfunctions that are correlated to multiple parameters and/or represent unprecedented states.

BRIEF SUMMARY OF THE INVENTION

One aim of the invention is to find a method for predicting a malfunction of a technical entity, where the method is independent of component types and can compute the probability of this malfunction for any future point in time.

Another aim of the invention is to find a computationally-efficient method for predicting a malfunction of a component and/or unit.

Another aim of the invention is to find a method that reduces the model creation and configuration effort required to predict a component malfunction.

Another aim of the invention is to find a method to configure such a method/apparatus for predicting a malfunction of a component/unit of a technical entity.

Another aim of the invention is to find a method for predicting a malfunction of a component based on the component's available condition and process parameters.

The invention achieves these aims through a method, computer program or apparatus for predicting component malfunctions comprised of the following steps:

determining a conditional probability distribution for a parameter of the component for a future point in time given the current value of the parameter based on the current value of the parameter, which is preferably a discrete value;

determining a conditional probability for a malfunction at the future point in time given the current value of the parameter based on the conditional probability distribution of the parameter for the future point in time given the current value of the parameter and on a conditional probability distribution for the malfunction given the parameter.

In other words, this problem is solved by determining a conditional probability distribution $P_{t0+\Delta t}$ $(a|a(t_0))$ for a parameter $a$ of the component for a future point in time $t_0+\Delta t$ given the current value $a(t_0)$ of the parameter based on the current value of the parameter $a(t_0)$; and by determining a conditional probability $P_{t0+\Delta t}$ $(M|a(t_0))$ for a malfunction $M$ at the future point in time $t_0+\Delta t$ given the current value $a(t_0)$ of the parameter based on the conditional probability distribution $P_{t0+\Delta t}$ $(a|a(t_0))$ of the parameter $a$ for the future point in time $t_0+\Delta t$ given the current value $a(t_0)$ of the parameter and on a conditional probability distribution $P(M|a)$ for the malfunction $M$ given the parameter $a$:

$$P_{t0+\Delta t}(M|a(t_0)) = f[P_{t0+\Delta t}(a|a(t_0)), P(M|a)].$$

The two-step approach of predicting first the future probability distribution of a parameter given its current value of the parameter, and determining second the probability of the malfunction given the current value of the parameter based on its conditional probability given the parameter allows a simple, general approach for determining the malfunctions of technical components. In the first step, well-known methods for predicting future parameter values can be used which are independent of both the functioning of the component and of the malfunction. The probability of the malfunction is calculated in a second step on the basis of the conditional probability of the malfunction given the parameter.

The invention achieves these aims through a method, computer program or apparatus for predicting a malfunction of a component, comprised of the following steps:

determining probabilities for single malfunctions of the component at a future point in time given current parameters by performing the steps of the described previous method; and determining a total probability of a malfunction of the component at the future point in time given the current parameters on the basis of the probabilities for single malfunctions of the component at the future point in time given current parameters.

According to the invention, these aims are achieved by a method, computer program or apparatus for predicting a malfunction of a unit with a plurality of components comprising the steps of:

determining probabilities for malfunctions of the plurality of components at a future point in time by performing the steps of any of the previous methods for each of the components;

determining a probability for a malfunction of the unit based on the probabilities of the malfunction of the plurality of components.

These methods allow an easy scaling from the most detailed level of components up to units and fleets without a significant increase in complexity.

According to the invention, these aims are achieved by a method, computer program or apparatus for configuring an apparatus, computer program or method for prediction of a malfunction of a unit comprising the steps of:

providing components of the unit, providing single malfunctions for each component, providing probabilities of the single malfunctions for each component, providing at least one parameter of each component for each single malfunction of this component, dividing each parameter into a plurality of discrete value states, providing values of the parameters, p determining a transition matrix for each parameter on the basis of the values of this parameter, wherein the transition matrix comprises for the plurality of discrete value states of each parameter the probabilities to switch from one of the discrete value states to another of the discrete value states within a certain time period;

determining the probabilities of the discrete value states of the parameters on the basis of the measurements of the parameters; and providing the conditional probabilities of the discrete value states of the parameters given the corresponding single malfunctions.

This method for configuring the prediction method allows to determining the necessary probability distributions which is not trivial.

The dependent claims refer to further advantageous embodiments of the invention.

In one embodiment, the conditional probability distribution for the malfunction given the parameter is determined based on the conditional probability distribution of the parameter given the malfunction, the probability of the malfunction, and the probability distribution of the parameter. This has the advantage that the conditional probability distribution of the parameter given the malfunction, the probability of the malfunction, and the probability distribution of the parameter are much easier to determine than the necessary conditional probability distribution for the malfunction given the parameter.

In one embodiment, the component is a mechanical or electrical component.

In one embodiment, the malfunction of the component is predicted on the basis of the conditional probability for a malfunction at the future point in time given the current value of the parameter. This could be achieved e.g. by outputting or displaying the resulting conditional probability for a malfunction at the future point in time given the current value of the parameter or by further processing the resulting conditional probability for a malfunction at the future point in time given the current value of the parameter.

In one embodiment, the current value of the parameter of the component is measured. Preferably this measurement is performed at the component, e.g. by a sensor.

In one embodiment, the steps for determining the conditional probability for a malfunction at the future point in time given the current value of the parameter are performed at a server. This server is preferably remote from the component or the components or at least some of the components.

In one embodiment, the current value is transmitted over a communication network to the server.

In one embodiment, the method comprises the further steps of:

providing a transition matrix, wherein the transition matrix is based on probabilities to switch from one of a number of discrete value states to another of the discrete value states;

providing the conditional probability distribution for the malfunction given the parameter being a conditional probability distribution for the malfunction given the discrete value states of said parameter;

providing the current discrete value state of said parameter;

wherein the step of determining the conditional probability distribution of the parameter of the component for the future point in time given the current value of the parameter comprises the step of determining a conditional probability distribution of the discrete value states of said parameter for the future point in time given the current discrete value state of the parameter based on the current discrete value state of the parameter and on the transitional matrix;

wherein the step of determining the conditional probability for the malfunction at the future point in time given the current value of the parameter comprises the step of determining a conditional probability for the malfunction at the future point in time given the current value state based on the conditional probability distribution of the discrete value states of said parameter for the future point in time given the current value state and on the conditional probability distribution for the malfunction given the discrete value states of said parameter. This has the advantage that the conditional probability distribution of the parameter of the component for the future point in time given the current value of the parameter can be determined by a Markov Model which has a low complexity and can be generalised for all types of components and units.

In one embodiment, providing shall have the meaning inputting. Inputting information comprises both, inputting the information directly or inputting another information from which the mentioned information is retrievable, e.g. by calculation. In another embodiment, providing means calculating the information.

In one embodiment, the intervals between the discrete value states are equidistant.

In one embodiment, the intervals between the discrete value states are logarithmic or exponential.

In one embodiment, the size of a value interval corresponding to a discrete value state of the discrete value states depends on the probability of the respective discrete value state. Hence optimal value states can be achieved. This has the advantage that the discrete value states have similar transition frequencies underlying each discrete value state.

In one embodiment, the method comprises the step of recording the values of the parameter and the step of determining the transition matrix on the basis of the recorded values of the parameter.

In one embodiment, the method comprises the step of determining the transition matrix on the basis of values of the parameter from the component and/or from other comparable components.

In one embodiment, the transition matrix is based on the probabilities to switch from one of a number of discrete value states to another of the discrete value states within a determined time period and the probability of the malfunction given the current discrete value state of the parameter is determined for a number of future points in time, wherein the future points in time are multiples of the determined time period.

In one embodiment, the method comprises the step of recording the values of the parameter.

In one embodiment, the statistical significance of the data underlying the probability for the malfunction at the future point in time given the current value of the parameter is calculated based on the statistical significance of the data underlying the conditional probability distribution of the parameter given the current value of the parameter.

In one embodiment, the probability for the malfunction given the current value of the parameter is determined for a number of future points in time.

In one embodiment, the probability distribution for the malfunction given a number of future points in time is displayed for the future points in time together with a statistical significance of the data underlying the probabilities for the malfunction.

In one embodiment, the method comprises the step of estimating a remaining useful life of the component on the basis of probabilities for the malfunction of the component given the number of future points in time.

In one embodiment, the function $f[P(a(t_0+\Delta t)|a(t_0)), P(M|a)]$ is based on the integral $\int P_{t0+\Delta t}(a|a(t_0))*P(M|a) \, da$ with the integral of the product of the conditional probability distribution $P_{t0+\Delta t}(a|a(t_0))$ with the conditional probability distribution $P(M|a)$ over the parameter a. In the case of a discrete value states, this becomes the sum $\Sigma_i[P_{t0+\Delta t}(a_i|a(t_0))*P(M|a_i)]$ of the products of the conditional probability distribution $P_{t0+\Delta t}(a_i|a(t_0))$ with the conditional probability distribution $P(M|a_i)$ for all discrete states i of the parameter a.

In one embodiment, the component is a gas turbine. The malfunction component is one of a bearing defect, compressor defect, combustion defect, flow malfunction, turbine malfunction, or output malfunction, and the parameter for predicting the malfunction is one or a combination of temperature, lubricant condition in the bearings or in the oil tank, shaft or casing vibration, temperature, flow and pressure of the gas in the turbine, speed of rotation, electric output of the coupled generator, ambient air temperature or humidity.

In one embodiment, the component is a transformer. The malfunction of the component is one of an insulation defect, cooling system defect or oil aging, and the parameter for predicting the malfunction is temperature of the coils, vibrations of the cooling fans, the condition and temperature of the oil surrounding the coils, or a combination thereof.

In one embodiment, the component is a diesel engine, the malfunction of the component is one of bearing defect, gearbox tooth wear, or turbo charger defect, and the parameter for predicting the malfunction is temperature, vibrations, lubricant condition, speed, or a combination thereof.

In one embodiment, the unit is an industrial asset.

In one embodiment, the method comprises the step of determining the conditional probability distributions for each single malfunction of each component given the corresponding discrete value states of the parameter used for determining this single malfunction based on the probabilities of the discrete value states of this parameter, on the probability of the single malfunction and on the conditional probabilities of the discrete value states of the parameters given the corresponding single malfunction.

In one embodiment, the configuration method comprises the step of providing probabilities for the single malfunctions of each component comprising:

receiving values indicating the relative probabilities of the single malfunctions of the corresponding component;

receiving a probability for a malfunction of the corresponding component caused by all of the single malfunctions;

determining the absolute probabilities of the single malfunctions of the corresponding component on the basis of the relative probabilities and the probability for the malfunction of the corresponding component caused by all of the single malfunctions.

In one embodiment of the configuration method, the relative probabilities are each indicated by a scale between a minimum and a maximum and the absolute probabilities of the single malfunctions are determined by rescaling the relative probabilities so that the sum of all relative probabilities yields the probability for having a malfunction of the corresponding component.

In one embodiment of the configuration method, for each single malfunction of the corresponding component additionally the relative impact of the single malfunction is received.

In one embodiment of the configuration method, the step of providing the conditional probabilities of the discrete value states of the parameters given the corresponding single malfunction (S29) comprises for each single malfunction of each component:

providing probabilities of the parameter indicating the single malfunction to be in a number of parameter intervals, when the single malfunction occurs, wherein the number of parameter intervals is smaller than the number of discrete value states of this parameter, and determining the conditional probabilities of the number of discrete value states of the parameters given the corresponding single malfunction on the basis of the conditional probabilities of the number of parameter intervals of the parameters given the corresponding single malfunction.

In one embodiment of the configuration method, the number of parameter intervals is smaller than or equal to five, preferably is equal to four.

In one embodiment, the method of the configuration comprises the step of determining a wear measuring quantity for each component.

BRIEF DESCRIPTION OF THE DRAWINGS

The invention will be better understood with the aid of the description of an embodiment given by way of example and illustrated by the figures, in which:

FIG. 6a shows an example diagram for presenting the single malfunction probabilities of a component, for different single malfunctions and different points in time;

FIG. 6b shows an example diagram for presenting the total probabilities of a malfunction of the components of the unit for different points in time;

FIG. 8 shows an exemplary diagram for determining the probabilities of the single malfunctions of a component; and FIG. 9 shows an exemplary diagram for determining the conditional probabilities of the discrete parameter value states given a set of malfunctions.

DETAILED DESCRIPTION OF POSSIBLE EMBODIMENTS OF THE INVENTION

Figure 1:
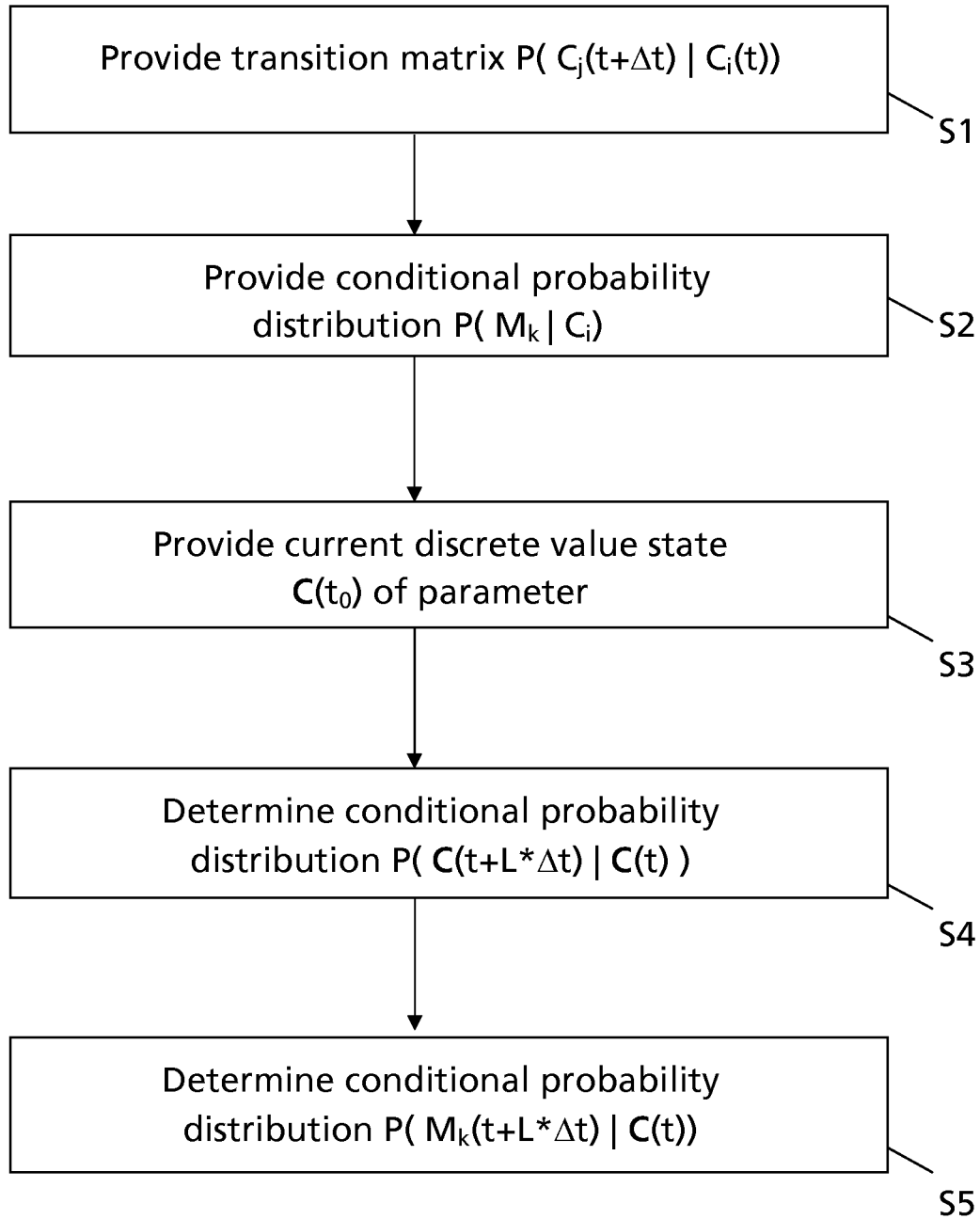
FIG. 1 shows an embodiment of a method for predicting a single malfunction of a component.

In the following certain terms of the invention shall be defined.

A component is a subpart of a unit. In one embodiment, the component is a functional subpart of the unit. The component is for example a wear part of the unit. The component could be a mechanical and/or electrical component of the unit for providing a corresponding mechanical and/or electrical function for the unit.

A unit comprises a plurality of components providing together a certain functionality of the unit. In one embodiment, the unit comprises different types of components. In one embodiment, the unit is an industrial asset. An example for an industrial asset unit is a power plant with components such as a nuclear reactor, a gas turbine, a steam turbine, a power generator, a cooling system, a transformer, etc. Another example for an industrial asset unit is an upstream oil & gas production site with components such as a pump, a compressor, a gas turbine and/or internal combustion engine, a power generator, and a pipe system. Another example for an industrial asset unit is a cement plant with components like a raw mill, coal mill, rotary kiln, a clinker, an air-to-air cooler, etc. Yet another example for an industrial asset unit is a heavy truck or heavy mobile machine, such as those used in mining, with components such as a diesel engine, gearbox, hydraulic system, tools, etc. Another example for an industrial asset unit is a plane with components such as jet engines, fuselage, air brakes, doors, etc. An additional example for an industrial asset unit is a locomotive with components such as a diesel engine or electric motor, a gearbox, bogies with wheels, axles and a brake system, etc. A further example for an industrial asset unit is a transmission facility with transmission and/or distribution transformers, switches, etc. These examples shall not be exclusive. It is also possible to apply this method to technical entities that are non-industrial units, for instance hospitals with components such as medical diagnostic and/or surgical instruments. These include CT-tomographs, surgery robots, MRT-tomographs, etc.

A fleet is an asset operator's collection of units. The asset operator can be the provider of a service or the manufacturer of a product, for instance an airline operating a fleet of planes or an electricity provider with a fleet of power plants. By way of additional examples, a transmission system operator with a fleet of power transmission equipment— transformers, switches, etc.—a mining company operating a fleet of mining trucks and mining tools, or an oil & gas company is operating a fleet of oil & gas facilities, etc. These examples shall not be exclusive, and the invention can be applied to any other fleet.

The term malfunction can be interpreted as operating conditions, mechanical, electrical, chemical or other problems that—if not treated—may cause degradation in performance, an unplanned shutdown, or a catastrophic failure. The terms malfunction and type of malfunction are synonymous. The term single malfunction refers to one specific type of malfunction of the component or unit, while the total malfunction refers to any malfunction of the component or unit.

The term probability of the malfunction can either be the probability of having such a malfunction or of not having such a malfunction. Both probabilities are complementary information, meaning that knowing allows calculation of the other through one minus the probability. Both probabilities—of having or non-having a malfunction—shall fall under the term probability of the malfunction.

In accordance with the invention, the state-of-the-art parametric model is replaced by a stochastic model which can be used for any type of component. In the following the stochastic model is presented and the steps for an embodiment of a method for predicting a single malfunction $M_k$ of a component is described and shown in FIG. 1.

If not already defined, at least one parameter is chosen for detecting the single malfunction $M_k$ of the component. In one embodiment, the parameter is a physical, electrical, chemical, or other parameter of the component, such as vibration, temperature, water condition, oil condition, current, voltage, pressure, etc. In one embodiment only one parameter may be chosen, while in another embodiment at least two parameters may be chosen. A value range of the parameter is divided into a number N of discrete value states $C_i$ with $i=1, \ldots, N$. In one embodiment, the value states may be distributed equidistantly over the parameter value range, while in another embodiment the value states may be distributed logarithmically over the parameter value range. In yet another instance, the value states are distributed exponentially over the parameter value range. In another embodiment, the value states are distributed in dependence of the probability of the parameter. This means that value states including parameter values appearing with high probability encompass a smaller parameter value range than value states including parameter values appearing with lower probability. Therefore, it can be guaranteed that all value states contain a reasonable number of parameter values to create significant results. In the case that two parameters are chosen for detecting one single malfunction, the two-dimensional parameter value state space has to be divided into a number of discrete value states, with each value state covering a certain area in the parameter value state space. Analogously, in a case of n parameters, the n-dimensional value state space would be divided in a number of discrete subspaces forming the discrete states. An alternative is to detect the single malfunction individually on the basis of each parameter and then to combine the parameter-specific conditional probabilities of the malfunction.

In a first step S1 of the method of the present embodiment, a transition matrix T for the selected parameter has to be provided with the entry in the i-th row and the j-th column:

$$T_{ij} = P(C_j(t+\Delta t) | C_i(t))$$

Where P is the probability to change within one time step $\Delta t$ from the state $C_i$ to the state $C_j$ of the parameter. In one embodiment, the transition matrix T is received. In another embodiment, the transition matrix T is computed based on the past values of the parameter of only this component. In yet another embodiment, the transition matrix is computed by the past values of the parameter of identical or similar components. In another embodiment, the transition matrix T is obtained through expert assessment. This embodiment is in particular important, when there are not yet data available in some or all of the parameter value states. In one embodiment, the transition matrix is updated periodically on the basis of new values of the parameter. All five embodiments can be combined or sub-combinations of them can be formed. The parameter values are typically recorded or measured during operation. Preferably, the recorded values are cleaned before their usage in determining the transition matrix, e.g. by removing parameter values recorded during periods the component and/or the unit is not operated in a representative operating state and/or is not operated in a specific operating state. Depending on whether column or row vectors are used, T or the transposed matrix $T^T$ is used.

In a second step S2, the conditional probability distribution P $(M_k|C_i)$ for the single malfunction $M_k$ given the discrete value states $C_i$ of said parameter for i=1, . . . , N is provided. In one embodiment, this probability distribution is received, e.g. in a computer, server, database, or other apparatus performing the method. In another embodiment, this probability distribution is determined. In theory, $P(M_k|C_i)$ could be statistically inferred through very disciplined condition monitoring and recording of $C_i$ together with empirical malfunction tests on $M_k$. This would typically involve crash testing, or at least serious risk of asset failure and downtime, which in practice is rarely possible due to the high downtime costs. Instead, equipment operators, in particular on-site reliability managers and component engineers, use experience-based alarm levels for the parameter to detect malfunctions and to pre-empt downtime. Since neither internal nor external experts can typically assess directly the required probability $P(M_k C_i)$, a Bayesian assessment technique is used:

$$P(M_k|C_i)=P(C_i|M_k)*P(M_k)/P(C_i).$$

Now the probability P $(C_i|M_k)$ that the parameter is in a certain state $C_i$ when the malfunction $M_k$ occurs, can be determined on the basis of expert assessments. The probability $P(M_k)$ of the single malfunction $M_k$ can be retrieved in different ways. In one embodiment, it is determined on the basis of malfunction statistics for the component. In another embodiment, it is determined on the basis of malfunction statistics for identical or equivalent components. In another embodiment, it is determined on the basis of expert assessments as explained later with respect to FIG. 8. The probability P $(C_i)$ of the discrete state $C_i$ can be computed from the data history of the parameter. The probability P $(C_i)$ of the discrete state $C_i$ can be periodically updated on the basis of new values/measurements of the parameter. Repeating this procedure for the discrete value states $C_i$ with i=1, . . . , N yields the probability distribution P $(M_k|C_i)$ with i=1, . . . , N.

In a third step S3, the current value state $C(t_0)$ of the selected parameters is provided. Here the state vector $C(t_0)$ $\in R^N$ and $C \in R^N$ is a sparse vector comprising a "1" at the position referring to the current value state $C_i$ and a "0" for all the other states Cj with i≠j, representing the probability distribution. However, the current value state can be provided in any other form. In one embodiment, the current value state $C(t_0)$ is determined on the basis of a current measurement of the parameter value. In another embodiment, the current value state $C(t_0)$ is determined on the basis of an assessment or estimate of the parameter value. The current time is referred with $t_0$. The term "current time" in this invention is interpreted as the time of the last value/measurement of the parameter(s) available. This could be in one example the actual time for online monitoring or an hour ago or yesterday in another.

In a fourth step S4, the state $C(t_0+L*\Delta t)$ of the parameter at a future point in time $t_0+L*\Delta t$ is predicted. In one embodiment, the time step $\Delta t$ is a day, such that $t_0$ corresponds to today and $t_0+L*\Delta t$ to L days later. However, any other time step is possible. This is performed on the basis of a stochastic process model, such as a Markov chain, by multiplying the current state $C(t_0)$ with the transition matrix T $$P(C(t_0+\Delta t)|C(t_0))=T*C(t_0)$$

to retrieve the probability of the state $C(t_0+\Delta t)$ after the time period $\Delta t$ corresponding to the transition matrix T. By repeatedly applying the transition matrix T L times, the probability of the state $C(t_0+L*\Delta t)$ after L time periods $\Delta t$ can be retrieved:

$$P(C(t_0+L*\Delta t)|C(t_0))=T^L*C(t_0).$$

In step S5, the probability of a single malfunction $M_k$ at the future point in time $t_0+L*\Delta t$ is determined. The stochastic model combines Markov chains for predicting the discrete value state of the parameter at a future point in time $t_0+L*\Delta t$ with the conditional probability distribution $P(M_k|C_i)$ for the malfunction $M_k$ given the discrete states $C_i$ of said parameter. This yields the probability of the malfunction $M_k$ at the future point in time $t_0+L*\Delta t$, given the current discrete parameter value state $C(t_0)$ at the current time $t_0$:

$$P(M_k(t_0+L*\Delta t)|C(t_0)) = \Sigma_{i=1,...,N} P(M_k|C_i)*P(C_i(t_0+L*\Delta t)|C(t_0))$$
$$= P(M_k|C)^T * P(C(t_0+L*\Delta t)|C(t_0))$$
$$= P(M_k|C)^T * T^L * C(t_0).$$

Multiplying this state vector $C(t_0)$ L times with the transition matrix $T\Delta R^{N\times N}$ yields the probability distribution for a value state vector $P(C(t_0+L*\Delta t)|C(t_0)) \in R^N$ with N entries, wherein the i-th entry indicates the probability $P(C_i(t_0+L*\Delta t)|C(t_0))$ of the state $C_i(t_0+L*\Delta t)$ given the current value state $C(t_0)$ with i=1, . . . , N. Additionally, the probability vector $P(M_k|C) \in R^N$ contains the N probability elements $P(M_k|C_i)$ for the malfunction $M_k$ given each state $C_i$, for i=1, . . . , N. This allows the same stochastic approach for modelling malfunctions of any unit or component. There is no need to model the component to predict malfunctions. The shown order of the steps S1 to S5 is not mandatory; in particular S1 to S3 could be performed in any order.

In one embodiment, the method described before is performed by an apparatus for predicting the malfunction. An embodiment of such an apparatus is described in FIG. 3. Such an apparatus can be a server, preferably a server being remote from the component, a normal computer, a server computer or also any circuit adapted to perform the described method. Said apparatus could receive all the necessary information for the configuration and/or the current values of the parameter (or directly the current value states of the parameter) by an interface. In one embodiment, the interface is connected to a communication network to receive the information for the configuration and/or the current values of the parameter from a remote location. The communication network or connection could be wired (e.g. Internet, LAN, or combination of those) or wireless (WLAN, Near-field communication, mobile telephone communication like GSM, UMTS, LTE, etc., or combinations of those). Each time a new current value for a parameter is received, the prediction for the malfunction given the new current value is determined as described above and a certain output is prepared to show the prediction of the malfunction, e.g. in a visual way. The current value can be sent periodically to the apparatus (e.g. every hour, every day, every week).

In one embodiment, the apparatus for performing the method mentioned above is part of a system including also the component, a sensor for measuring the current value of the parameter of the component and a communication network connecting the sensor with the apparatus for performing the method mentioned above. In this case, the prediction of the malfunction of the component can be fully automated by measuring the current value of the parameter by the sensor, transmitting the parameter to the apparatus and predicting the malfunction by the apparatus as described above. However, in an alternative embodiment, the current value of the parameter could be determined or measured by a human and the measurement result could be inserted in an input interface of said apparatus or an input interface transmitting the measurement result, i.e. the current value, to the server.

Figure 2:
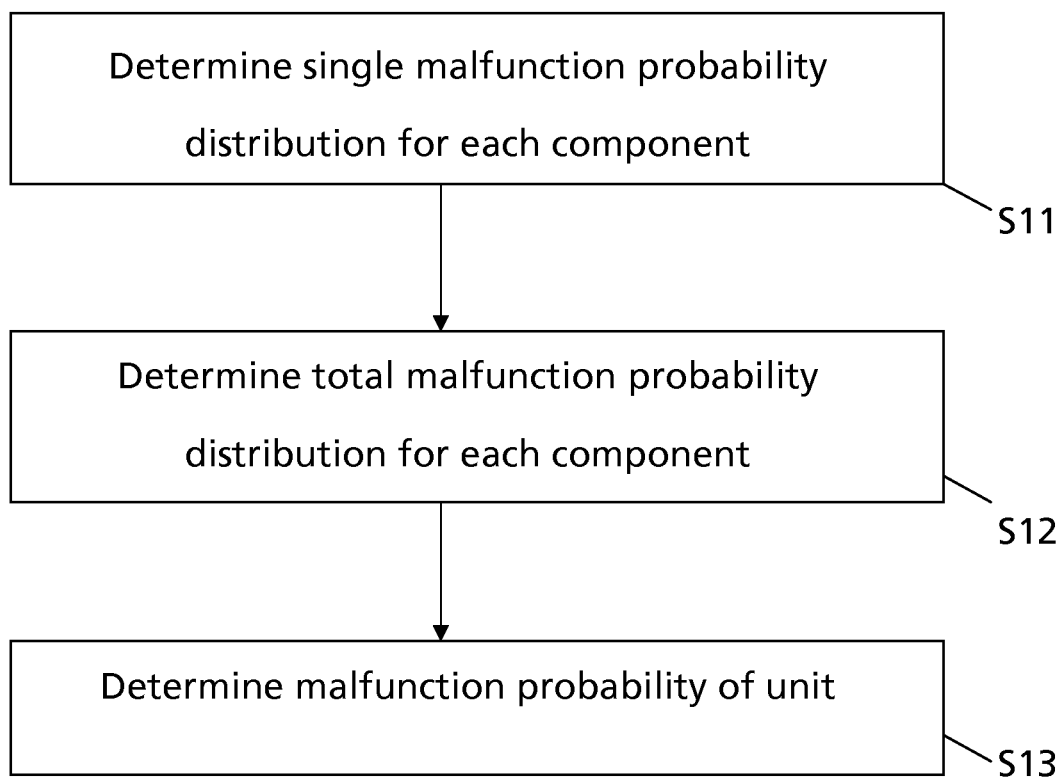
FIG. 2 shows an embodiment of a method for predicting a malfunction of a unit.

FIG. 2 shows an instance of a method for predicting a malfunction of a unit comprising a plurality of components. In a first step S11, for each component l and for each malfunction $M_{lm}$ of this component l, the probability $P(M_{lk}(L*\Delta t)|C_{li}(t_0))$ of the malfunction $M_{lk}$ given the current value state $C_{li}(t_0)$ of the parameter of the component l selected for determining the malfunction $M_{lm}$ is determined. In step S12, the probability for any malfunction of this component l is determined on the basis of the probabilities for all single malfunctions $M_{lk}$ of the component l, with k=1, 2, 3, . . . . The probabilities of all single malfunctions of a component can be combined to the total probability of malfunction of the corresponding component. The combination can be based on stochastic rules considering their degree of dependence. For example, in the case of independent malfunctions $M_{lk}$ the probability of the single malfunction $P(M_l)$ can be provided by $$P(M_l)=1-\Pi_{k=1,2,3,\ldots}(1-P(M_{lk})).$$

In case of dependent malfunctions $M_{lk}$, the probability of the single malfunction $P(M_l)$ can be calculated by $$P(M_l)=\text{Max}_{k=1,2,3,\ldots}P(M_{lk})$$

The effects of different single malfunctions $M_{lm}$ are however not always the same on the component l. Some malfunctions should be handled by an immediate shutdown of the component, others by an alarm, and some by a simple alert. Therefore, the probabilities for different single malfunctions can be combined to a total probability of a malfunction of the component considering the different effects of all single malfunctions. If for some or all components only one single malfunction is determined, the probability of this one malfunction corresponds to the total probability of malfunction of the component. In step S13, the probability for a malfunction of the unit is determined on the basis of the total probabilities of malfunction of the components of the unit. In one embodiment, the probability of malfunction of the unit is computed on the basis of a dependency structure of the components in the unit. It is also possible to combine the total probabilities of malfunction of different units to obtain a fleet malfunction probability. This can be used for fleet asset management considering the probability of malfunction of operating units at any specific point of time in the future.

In one embodiment, the steps of the method described in relation to FIG. 2 can be performed by the same apparatus performing the method described in FIG. 1. An embodiment of such an apparatus is described in FIG. 4. However, it is alternatively also possible, that for the malfunction prediction of each component another apparatus is used or that at least two apparatuses are used to predict the malfunction of the plurality of components and to combine those probabilities of malfunction of the single components in one of those apparatuses or in another apparatus. In one embodiment, there is one intermediate server collecting all current values of parameters of the components of one unit and transmitting the collected current values over a communication network to the apparatus for performing the method described in FIGS. 2 and 1. The intermediate server could receive the current values automatically from a sensor at the components or by interfaces which allow users to insert the measurement results or combinations of both.

Figure 3:
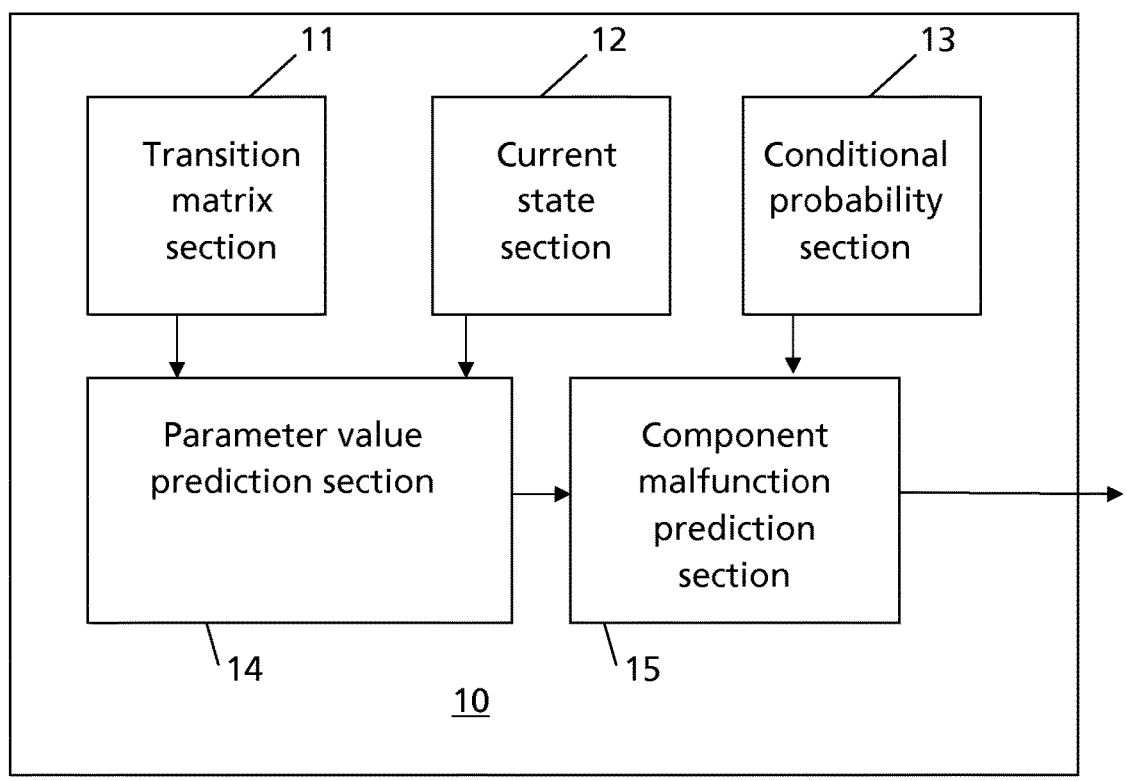
FIG. 3 shows an embodiment of an apparatus for predicting a single malfunction of a component.

FIG. 3 shows an embodiment of an apparatus 10 for determining the probability of a single malfunction $M_k$ of a component. The apparatus 10 comprises a transition matrix section 11, a current state section 12, a conditional probability section 13, a parameter value prediction section 14, and a component malfunction prediction section 15.

The transition matrix section 11 is configured to provide the transition matrix T. In one embodiment, the transition matrix T is determined externally and then received at the transition matrix section 11, where it is stored for predicting the related discrete value states for the future point(s) in time. In another embodiment, the transition matrix section 11 is configured to determine the transition matrix T on the basis of past measurement of the parameter of the component and/or of a comparable component.

The current state section 12 is configured to provide the current value state C of the parameter used for predicting the malfunction $M_k$. In one embodiment, the current state section 12 receives directly the current state C. In another embodiment, the current state section 12 is configured to determine the current value state on the basis of an empirical measurement of the parameter value of the component. In another embodiment, a probability distribution is used to estimate the current state.

The conditional probability section 13 is configured to provide the conditional probability distribution $P(M_k|C)$ for the malfunction $M_k$ given the discrete value state C of said parameter. In one embodiment, this probability distribution is simply received in the conditional probability section 13. In another embodiment, this probability distribution is determined in the conditional probability section 13 on the basis of the probability $P(C_i|M_k)$ that the parameter is in a certain state $C_i$, when the malfunction $M_k$ occurs, the probability $P(M_k)$ of the malfunction $M_k$, and the probability $P(C_i)$ of a certain discrete value state $C_i$. In another embodiment, the conditional probability distribution $P(M_k|C)$ is obtained from comparable components.

The parameter value prediction section 14 is configured to predict the probability distribution of the discrete states $C_j(t_0+L*\Delta t)$ at a future point in time $t_0+L*\Delta t$ based on the transition matrix T and the current state vector $C(t_0)$.

The component malfunction prediction section 15 is configured to predict the probability of the single malfunction $M_k$ in the future $t_0+L*\Delta t$ given the current value state $C(t_0)$ based on the probability $P(C_i(t_0+L*\Delta t)\ C(t_0))$ of the state $C_i(t_0+L*\Delta t)$ at the future point in time $t_0+L*\Delta t$ with i=1, . . ., N given the current value state $C(t_0)$ and the conditional probability distribution $P(M_k|C_i)$ for the malfunction $M_k$ given the discrete value states $C_i$ of said parameter with i=1, . . . , N.

The apparatus 10 computes in this embodiment the probability of the single malfunction $M_k$ at the future point in time $t_0+L*\Delta t$ given the current value state $C(t_0)$ of the parameter. In another embodiment, the apparatus 10 can determine the probability of the single malfunction $M_k$ at the future point in time $t_0+L*\Delta t$ given the current value state $C(t_0)$ of the parameter for different future points in time, i.e. for different L out of the set of natural numbers. This allows displaying a function for the probability of a malfunction over a future time horizon. On the basis of the probability of a malfunction for at least one future point in time—preferably several points in future points in time, a potential malfunction event or remaining useful lifespan can be estimated. In another embodiment, the apparatus 10 is further configured to compute the significance of the data underlying the probability of the single malfunction $M_k$ in the future point of time $t_0+L*\Delta t$ given the current value state $C(t_0)$ of the parameter for different future points in time.

Figure 4:
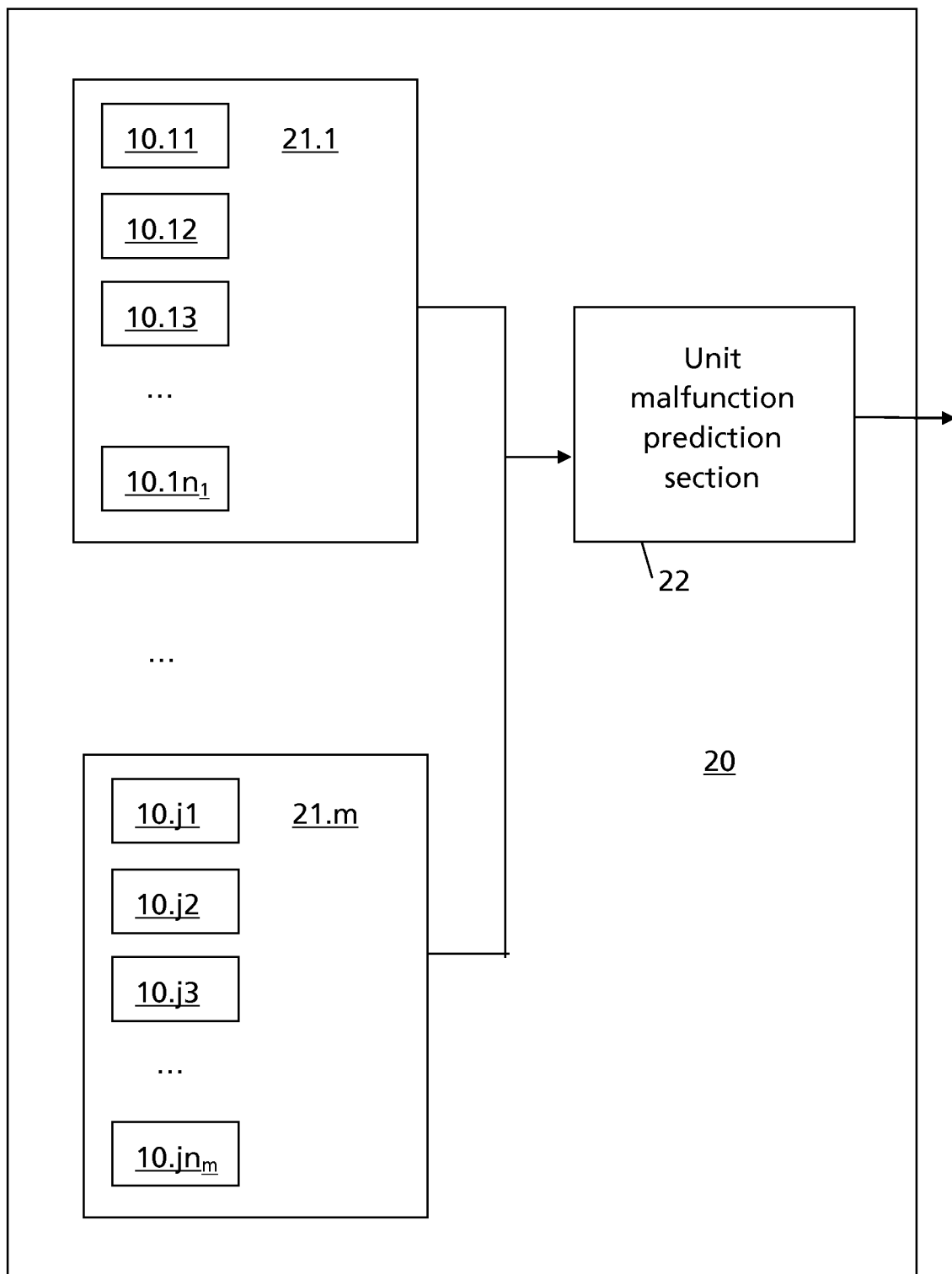
FIG. 4 shows an embodiment of an apparatus for predicting a malfunction of a unit.

FIG. 4 shows an embodiment of an apparatus 20 for predicting the malfunction of a unit with a plurality of components. The apparatus 20 comprises the component total malfunction prediction sections 21.1 to 21.m and a unit malfunction prediction section 22.

Each component total malfunction prediction section 21.j is configured to predict the total probability of a malfunction of the corresponding component j with j=1, . . . , m. Each component total malfunction prediction section 21.j comprises $n_j$ single malfunction prediction sections 10.ji with j=1, . . . , m and i=1, . . . , $n_j$. Each single malfunction prediction section 10.ji is configured to predict the i-th single malfunction of the j-th component of the unit. The structure and functioning of each single malfunction prediction section 10.ji corresponds to the apparatus 10 shown in FIG. 3. Each component total malfunction prediction section 20.j is configured to predict the total probability of a malfunction of the corresponding j-th component on the basis of the probabilities of the $n_j$ single malfunctions of the j-th component.

The unit malfunction prediction section 22 is configured to predict the malfunction of the unit on the basis of the m predicted probabilities of the malfunction of the m components of the unit. Therefor, the unit malfunction prediction section 22 computes the total probability of malfunction of the unit given the current parameter value states on the basis of the m total probabilities of the malfunction of the m components of the unit.

The method and the apparatus for predicting a single malfunction of a component presented have the advantage that they do not need a single physical model of the component with a complete understanding of its functioning. The only necessary information for each single malfunction $M_k$ is:
The parameter(s) that indicate the malfunction $M_k$;
a significant set of measurements of the parameter(s) to compute $P(C_i)$ and T;
the absolute probability of $P(M_k)$; and
the conditional probability distribution $P(C_i|M_k)$ for the malfunction $M_k$ given the discrete value states $C_i$ of said parameter.

Therefore, this method has the advantage that it can be applied to every kind of component of a technical entity unit and to every kind of malfunction. Therefore, the malfunctions of all components can be computed by the same procedure. This allows a very easy scaling of the method from a small component to a fleet of technical entities. Once the method is configured, the method can be automatically improved by a machine learning algorithm which updates regularly the transition matrix and the probability distribution $P(C_i)$ for i=1, . . . , N of the parameter value states $C_i$ for i=1, . . . , N on the basis of new values/measurements of the parameter.

In one embodiment, the component is a gas turbine. In one embodiment, the gas turbine is coupled with a generator with a power output larger than 100 MVA, in particular larger than 150 MVA. Typical single malfunctions for a gas turbine are bearing defects, compressor defects, flow malfunction, turbine malfunction or output malfunction. One or any combination of the following parameters can be used for detecting/predicting the respective single malfunctions: temperature, lubricant condition in the bearings or in the oil tank, and shaft or casing vibration for detecting/predicting bearing defects; temperature and pressure of the gas in the turbine for detecting/predicting flow problems; temperature, rotation speed of the turbine, and electric output of the generator for detecting/predicting turbine problems; ambient air condition and humidity for detecting/predicting output problems of the turbine.

In one embodiment, the component is a transformer. In one embodiment, the transformer is configured for a power larger than 100 MVA, in particular larger than 150 MVA. In one embodiment, the transformer has coils which are surrounded by oil. In another embodiment, the transformer has cooling fans. Typical single malfunctions for a transformer are insulation defects or cooling system defects. One or any combination of the following parameters can be used for detecting/predicting the respective single malfunctions: temperature of the coils, vibration of the cooling fans, and the condition and temperature of the oil for detecting/predicting insulation defects. An example for the oil condition could be the moisture level or dissolved gases in the oil.

In one embodiment, the component is a diesel engine. In one embodiment, the diesel engine has a power of more than 200 kW, in particular more than 300 kW. Typical single malfunctions for a diesel engine are bearing defects or turbo charger defects, in particular a defect of the compressor of the turbo charger. One or any combination of the following parameters can be used for detecting/predicting the respective single malfunctions: temperature, vibrations, lubricant condition, and fuel analysis for detecting/predicting bearing defects; temperature, vibrations, lubricant condition, outlet pressure of the compressor, and fuel analysis for detecting/predicting turbo charger defects.

Figure 5:
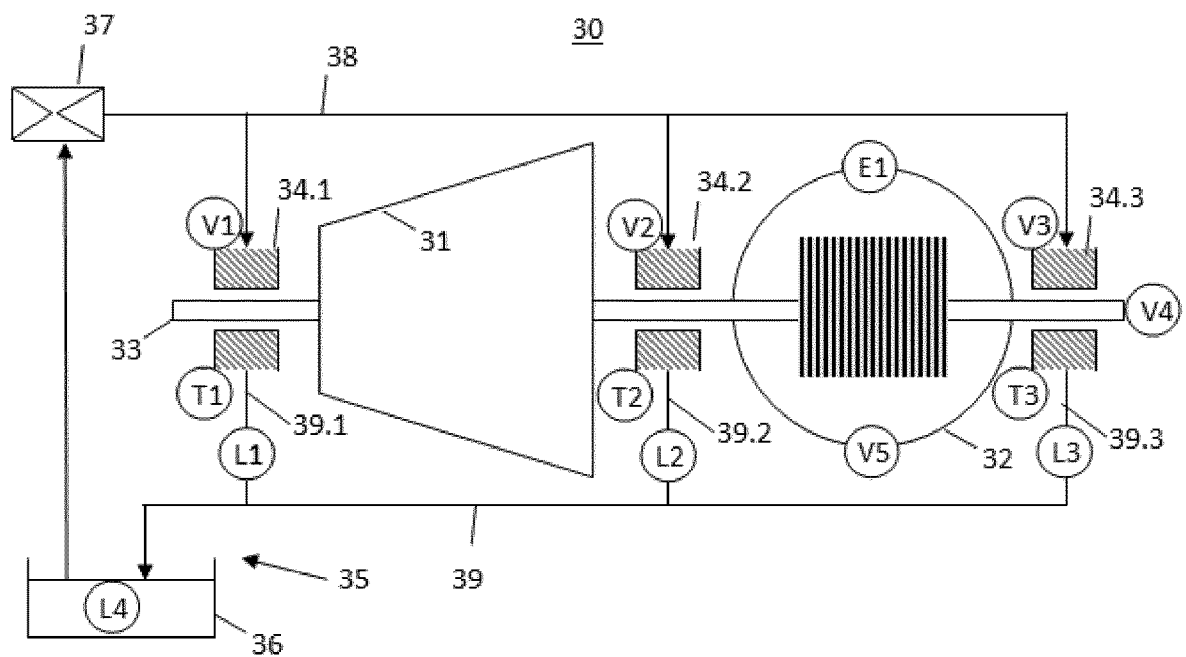
FIG. 5 shows schematically a steam turbine as an exemplary embodiment of a component, with its subcomponents and monitored parameters.

FIG. 5 shows now a steam turbine 30 as an embodiment of a component. This steam turbine 30 comprises a turbine 31, a generator 32, an axle shaft 33, bearings 34.1, 34.2 and 34.3 and a lube oil circuit 35. The turbine 31 and the generator 32 are mounted on the axle shaft 33 which is born by the bearings 34.1, 34.2 and 34.3. The bearings 34.1, 34.2 and 34.3 are connected to the oil circuit 35 for exchanging the oil in the bearings 34.1, 34.2 and 34.3. The oil circuit 35 comprises an oil tank 36 and an oil pump 37 which pumps lube oil from the tank 36 to the bearings 34.1, 34.2 and 34.3 over the input link 38. The lube film bearings 34.1, 34.2 and 34.3 are connected with the tank 36 via the oil pipe 39. The oil pipe 39 comprises the single drain pipes 39.1, 39.2 and 39.3 in which the lube oil coming from the bearings 34.1, 34.2 and 34.3 is not yet mixed. The following parameters of this steam turbine 30 are measured: the vibrations of the axle shaft 33 at bearings 4.1 (V1), 34.2 (V2) and 34.3 (V3), the thrust vibration at bearing 34.3 (V4) and the casing vibrations of the generator 32 (V5); the temperature of the three bearings 34.1 (T1), 34.2 (T2) and 34.3 (T3); the lubricant condition in the three individual drain pipes 39.1 (L1), 39.2 (L2) and 39.3 (L3) and the lubricant condition in the tank (L4); and the electric output E1 of the generator 32 (E1).

FIG. 6a shows a matrix of the probabilities of different single malfunctions for different future points in time. The malfunctions M1 to M12 are listed in rows and the future points in time in columns. The total probability of a malfunction for the component is shown as well in the last row. This total probability of a malfunction of the component can be determined on the basis of the single malfunction probabilities. Note that the computation of the probability of some malfunctions, here M11 and M12, were deselected and are thus empty. In this case, the malfunction probability of all malfunctions M1 to M11 stays below 10% until April 4. Then, the prediction for April 11 shows an increased probability of malfunction M7, i.e. a particulate contamination, with more than 10%. If the next maintenance is before this date, this should be no problem. Otherwise, it could be advisable to reschedule maintenance, to take advantage of other scheduled or unscheduled downtime prior to April 4, to change the operational strategy such as load or speed reduction for the component, or to address the problem otherwise. In addition, the table of FIG. 6a further shows the significance of the data underlying the calculated probabilities. Here a reduced significance, i.e. medium predictive strength, for the probabilities of M1 to M5 for the period after February 22 and a low significance, i.e. low predictive strength, for the probabilities of M1 to M4 for the period after March 21 are calculated. For the single malfunction M5, the significance of the data underlying the calculated probability shows already for the March 14 a low predictive strength. For the single malfunctions M6 to M10, the significance of the data underlying the calculated probability show only for April 11 a medium predictive strength FIG. 6b shows now the total probability of each component of the unit, i.e. here of each component of a power plant analogue to FIG. 6a. In FIGS. 6a and 6b, the probabilities are written explicitly. It could be more intuitive to show the probabilities by discrete probability ranges, e.g. the parameter ranges below 10%, between 10% and 25% and above 25%. Those ranges could be shown by different colours and provides an intuitive way to show this information.

Figure 7:
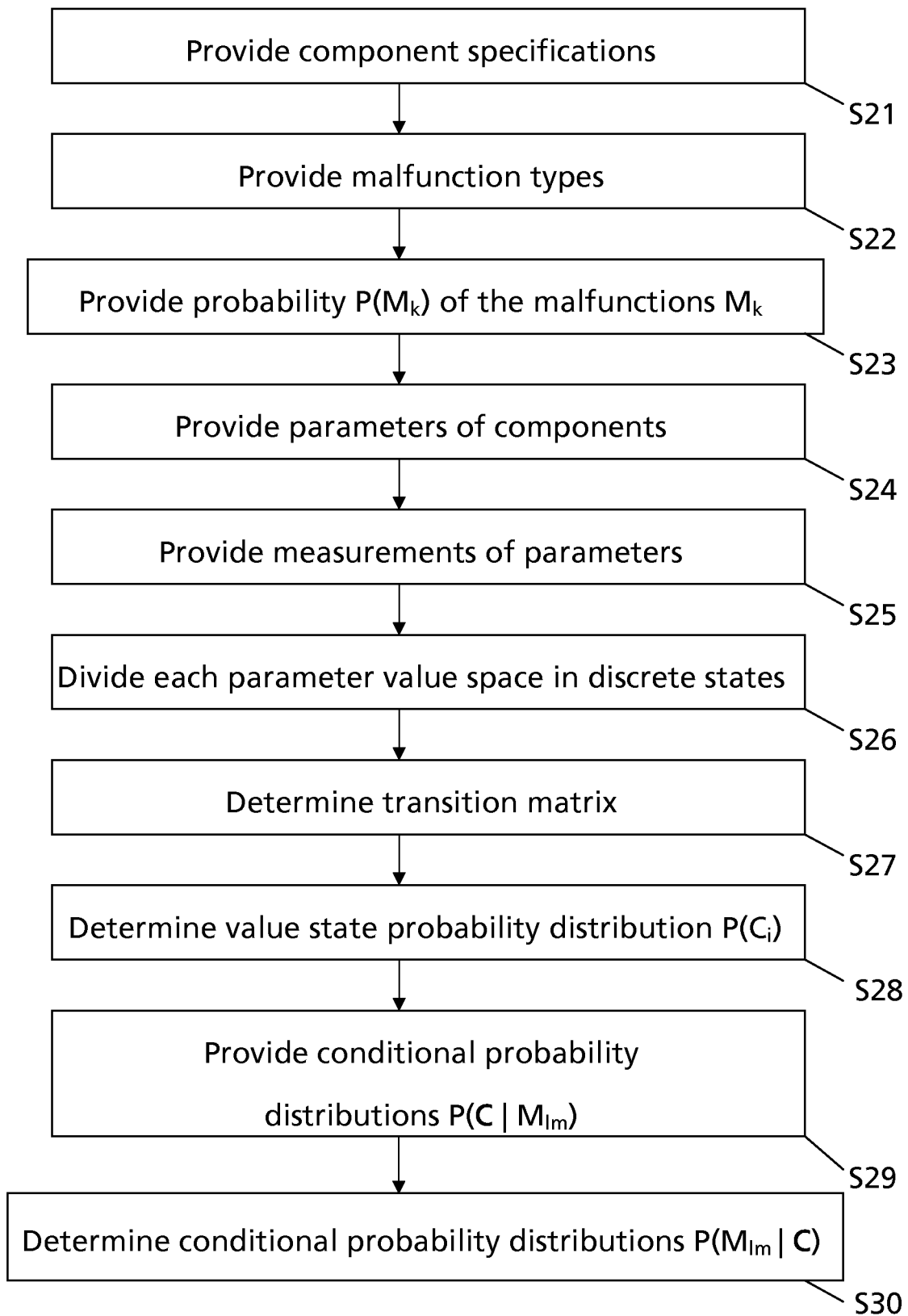
FIG. 7 shows an embodiment of a method for configuring an apparatus for the prediction of a malfunction of a unit.

FIG. 7 shows now a method for configuring the prediction apparatus/methods described above. In a first step S21, the components of the unit are defined. This can be done by a computer-based configuration tool or by hand, or be received from a third party or apparatus. In one embodiment, only essential components or components which at least have severe consequences tied to availability, operability, or capacity of the unit are used. This has the consequence that the malfunction of one component leads directly to a malfunction—or at least a severe problem—for the unit, and the probability of a malfunction of the unit is the function of the probabilities of malfunction of the components of the unit. In one embodiment, a wear measuring quantity is provided with the components which allows estimating the remaining useful lifespan in general. This remaining useful lifespan is shortened, if the above described methods predict an earlier malfunction. It can be prolonged by removing the cause of the malfunction through maintenance, change of operational scenario, etc. In another embodiment, all available parameters for each component are defined as well, allowing identifying potential parameters for detecting/predicting malfunctions of the component.

In step S22, the single malfunctions of each of the components are defined. This can be performed by a computer-based configuration tool, or by hand, or be received from a third party. In one embodiment, for each malfunction-component couple, the potential parameters for detecting such a single malfunction are defined as well. This facilitates later determination of the best parameters for malfunction prediction.

In step S23, the probability $P(M_{ji})$ of each malfunction i for each component j is provided. The probability of each malfunction for each component can be computed, assessed, or received from a third party. This can be done by computer-based tool or by hand. For some components, there is historical data on all malfunctions that have occurred on this component or on equivalent components, in which case the probabilities can be estimated on the basis of this historical data. However, often such data is not available. Therefore, in another embodiment, these probabilities are determined by expert assessments. Since it is hard to tell the absolute probability of a single malfunction of a component, the input of the relative probability of this malfunction compared to the other malfunctions is asked. This relative probability can be expressed for example by a scale from 1 to 10. Since the expert knows from his experience that malfunction A is more frequent than malfunction B, the relation between the likelihoods can be adapted compared to the other malfunctions of this component. FIG. 8 shows for the example of the steam turbine from FIG. 5 and FIG. 6a the twelve malfunctions and their relative likelihood. Assuming now that all malfunctions listed cover only a percentage A of all malfunctions of the component (steam turbine) (100%-A may be human errors and/or purely random malfunctions and/or malfunctions not detectable), then the relative likelihoods can be multiplied by a scaling factor so that their sum yields A. Therefore, the absolute probability of each malfunction is reached. In addition, together with the relative likelihood of each malfunction of the component, the relative impact of the malfunction is entered. This has two advantages. First, the relative impact of the corresponding malfunction can be related to the probability of a malfunction. Second, the user will see the difference between the relative likelihood and the relative impact of a malfunction, which are often mixed. Therefore, the information about the relative impact improves the quality of the input about the relative likelihood. The value of 80% for the probability A of all considered single malfunctions for one component is in most cases a good value. But the probability of all considered single malfunctions for one component could also be input for the computation of absolute probabilities of the single malfunctions. However, there are also other methods for calculating the probability distributions $P(M_{ji})$ In step S24, the parameters of the components used for predicting the single malfunctions of the components are determined. This could be performed for example by selecting them from the available parameters of the components. However, this step could also be done implicitly in step S28.

In step S25, the data histories of the parameters from step S24 are obtained. Normally, this data for the parameters comes from the corresponding component itself. However, if the parameter values have not been recorded in the past, the data of a comparable component can be used.

In step S26, each parameter used for detecting/predicting a malfunction of a component is divided in a plurality of discrete value states.

The exact number of discrete value states depends on the volume of data that can be obtained—the sampling time span and frequency. For example, the number of discrete states can be smaller than 50 or smaller than 40 or between 20 and 40. In one embodiment, the size of the parameter value intervals of the discrete value states is equal. In another embodiment, the size of the parameter value intervals of the discrete value states is logarithmic. In another embodiment, the size of the parameter value intervals of the discrete value states is exponential. In another embodiment, the size of the parameter intervals of the discrete value states depends on the frequency of the measurements. Preferably, the dependence is indirect, i.e. if the number of measurements for a certain parameter value range is higher than for another parameter value range, the size of the discrete value states in the parameter value range with higher number of measurements is smaller than for the other parameter value range.

In step S27, the transition matrix is determined for each parameter. The dimension of the transition matrix is quadratic and the number of columns or rows corresponds to the number of discrete value states. The entries correspond to the probability to switch from one value state to the other. The transition matrices can be calculated on the basis of the measurements of the parameters or—as previously described—on the basis of measurements of the parameters of comparable components or on the basis of expert assessments.

In step S28, the probability distribution of parameter values over the discrete value states is determined. In one embodiment, this probability distribution can be estimated on the basis of the historical parameter values. In another embodiment, the distribution is taken from comparable components. In yet another embodiment, it is assessed by experts.

In step S29, the conditional probability distribution for a discrete value state of a parameter given a malfunction is provided for all parameters and malfunctions of the components. In one embodiment, given recorded malfunction events during the operational history, along with their precise points in time, the parameter values of the corresponding components at the point of malfunction could be determined, and the probability distribution P(C|M) for the discrete value states C of the parameter given a certain malfunction M could be estimated based on this data. In another instance, P(C|M) is determined on the basis of data from a comparable component. In another embodiment, P(C|M) is determined by expert assessments. Therefore, the parameter value range of each parameter is divided into a reasonable number of parameter intervals. Preferably the reasonable number is smaller than the number of states for this parameter. In one embodiment, the reasonable number is smaller than ten, preferably smaller than six. In FIG. 9, an example for such an expert assessment is shown for only two parameters of a first component and three malfunctions. The parameter value range of each parameter is divided into four value ranges. A green range wherein the parameter is expected to be during normal operation. A yellow range which is an alert range and covers more or less only outliers. An orange range which would raise an alarm, and a red range where an immediate shutdown of the component/unit is expected. The colours are only arbitrary and the ranges can also be named differently, for example first to n-th. The expert can now determine the probability of a parameter being in one of the four ranges given a certain malfunction. Since the parameter P1.1 is not influenced by the malfunctions M1 and M2, the parameter P1.1 is expected to stay in the green range or at least shows the unconditional distribution of parameter values. However, the parameter P1.1 is influenced by a malfunction M3. An expert knows by experience more or less how the parameter values are distributed over those four parameter value ranges/intervals. The information is then translated to the probability of the discrete value states given the single malfunction. This simplification allows the necessary information to be obtained from the expert.

In step S30, the conditional probabilities P(M|C) for each malfunction and each discrete value state are determined on the basis of the formula $P(M_k|C_i)=P(C_i|M_k)*P(M_k)/(C_i)$ described above.

The order of the steps S21 to S30 is mostly arbitrary.

Figure 10:
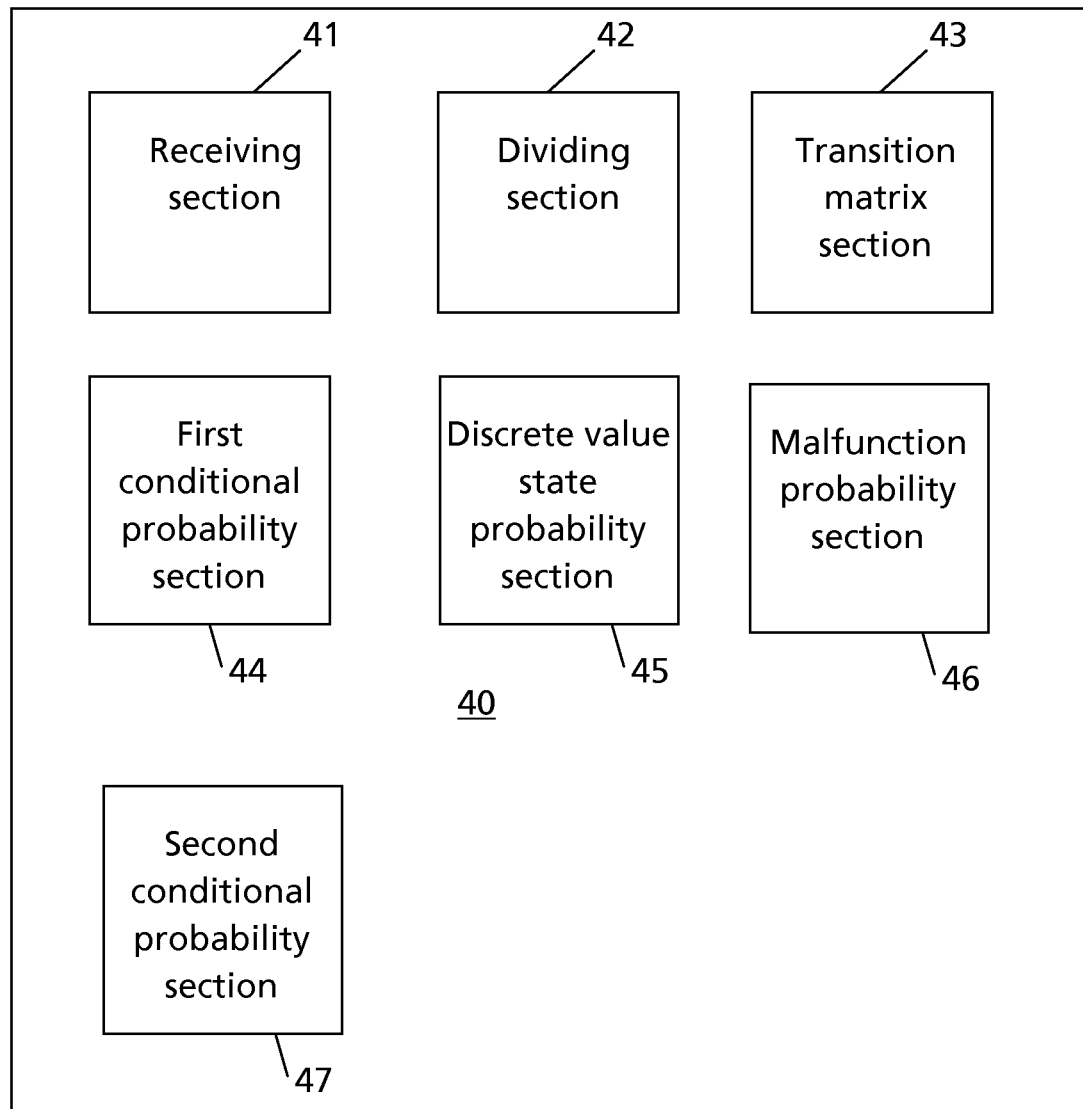
FIG. 10 shows an embodiment of an apparatus for configuring an apparatus for the prediction of a malfunction of a unit.

FIG. 10 now shows an apparatus 40 for configuring a prediction apparatus for the malfunction of a unit. The apparatus 40 comprises a receiving section 41, a dividing section 42, a transition matrix section 43, a first conditional probability section 44, a discrete value state probability section 45, a malfunction probability section 46, and a second conditional probability section 47.

The receiving section 41 is configured to receive information about:
components of the unit,
single malfunctions for each component,
values for determining probabilities for the single malfunctions of each component,
at least one parameter of each component for each single malfunction of this component,
parameter values;
values for determining the conditional probabilities of the discrete value states of the parameters given the corresponding single malfunction.

The dividing section 42 is configured to perform step S26. The transition matrix section 43 is configured to determine the transition matrices. The first conditional probability section 44 is configured to determine the conditional probability P(C|M) of the discrete value states given the single malfunctions. The discrete value state probability section 45 is configured to determine the probability P(C) of the discrete value states. The malfunction probability section 46 is configured to determine the probability P(M) of the single malfunctions. The second conditional probability section 47 is configured to determine the conditional probability P(M|C) of a single malfunction given a certain discrete value state.

Once the method/apparatus is configured, the method/apparatus for predicting a malfunction of a unit/component can be initiated. It is also possible to use the continuously received current parameter values to update T and P(C). It is also possible to use data which registers the single malfunctions of the components to update $P(M_k)$. With the continuous value recordings of the parameters and the identified malfunctions related to the parameter values, $P(C_i|M_k)$ can be updated continuously or periodically.

The shown embodiments are only exemplary and shall not restrict the invention. All embodiments covered by the scope of the set of claims shall be included in the invention.

The inventive step of determining a conditional probability distribution of a parameter of the component for a future point in time given the current value of the parameter was performed in the described embodiment by a discrete-time Markov chain (DTMC) model. However, this step can also be performed by a continuous-time Markov chain (CTMC) model. This can be performed by reducing the predetermined time period Δt. Alternatively, the formulas of the DTMC model can be replaced by the formulas for the CTMC model for computing the continuous transition probabilities. In this case the parameter value state vector C(t) is computed by $$P(C(t)|C(t_0)) = C(t_0) * e^{(t-t_0)*T}$$

with the time t, the current time $t_0$, and the transition matrix T. For the

CTMC model, the transition matrix comprises the transition rates (transitions per time period) from one to another of the discrete value states. The exponential function of the matrix t*T has the effect of the exponential function of each entry of the matrix t*T. The CTMC model could be interesting for parameters with high-frequency or for near continuous online monitoring.

The inventive step of determining a conditional probability distribution of a parameter of the component for a future point in time given the current value of the parameter was performed in the described embodiment by a Markov chain model dividing the parameter space into discrete parameter value states. However, other methods can also be used to determine the conditional probability distribution of a parameter of the component for a future point in time given the current value of the parameter. For example the distribution equation $$dP(a(t))/dt = D(a)d2P(a(t))/da2$$

with the probability distribution P(a(t)) of the parameter a at the time t and the distribution coefficient D(a) can be used to determine the conditional probability distribution P(a(t)|a($t_0$)) of a parameter of the component a(t) for a future point in time given the current value a($t_0$) of the parameter. The distribution coefficient could depend on the parameter a, or could be constant. For constant diffusion coefficients D the solution would be $$P(a(t)|a(t_0)) = P(a(t_0)) * \exp(a^2/4D(t-t_0))/\text{sqrt}(4\pi D(t-t_0)).$$

However, other methods for determining the conditional probability distribution of the parameter of the component for a future point in time given the current value of the parameter can also be used.

The invention is described here with respect to malfunctions of technical entities, machines, components, units, fleets, industrial assets, etc. However, the invention can in the future also be used to detect or predict other malfunctions such as specific and possibly critical physical or mental conditions of humans (illnesses, neurological malfunctions like epileptic seizures, genetic defects, etc.). Therefore, the component must be replaced by a part of the body, such as an organ or limb, and the unit would correspond to the human body. The single malfunctions would correspond to different specific conditions such as illnesses, neurologic malfunctions, genetic defects, etc. The parameters for detecting/predicting the malfunction would be preferably parameters of the body, e.g. blood pressure, heart rate, temperature, etc.

The invention can in the future also be used to determine the probability of certain achievements of the human body on the basis of the current parameters of the body. Therefore, the component must be replaced by the body or a part of the body. The single malfunctions would correspond to a single achievement. Achievements could be for example training goals, competition goals or diet goals. An example for a training goal could be to achieve a certain step frequency above a threshold over a certain period of time or a certain pulse frequency under a certain threshold. If the achievement comprises several sub-achievements, their probability can be combined as several single malfunctions can be combined to a general malfunction for technical entities. The parameters for predicting the achievement would be preferably parameters of the body, e.g. blood pressure, heart rate, step frequency, velocity during an activity, calorie consumption etc.

Thus a method for predicting a specific condition or achievement of a human body could comprise the steps of.

determining a conditional probability distribution of a parameter of the human for a future point in time given the current value of the parameter based on the current discrete value of the parameter;

determining a conditional probability for the specific condition or achievement at the future point in time given the current value of the parameter based on the conditional probability distribution of the parameter for the future point in time given the current value of the parameter and on a conditional probability distribution for the specific condition or achievement given the parameter. The parameter of a human body comprises also parameters of his activity like a velocity, a step frequency, a pedalling rate, etc.

What is claimed is:

1. Method for configuring an apparatus for predicting the malfunction of a unit and for maintenance of the unit, wherein the configuring of the apparatus comprises the steps of:

receiving, in the apparatus, information about components of the unit, wherein the components are mechanical or electrical components of the unit, receiving, in the apparatus, at least one single malfunction for each component, receiving, in the apparatus, probabilities for the at least one single malfunction of each component, receiving, in the apparatus, at least one parameter of each component for each single malfunction of this component, dividing, in the apparatus, each parameter into a plurality of discrete value states, receiving, in the apparatus, values of the parameters, determining, in the apparatus, a transition matrix for each parameter on the basis of the received values of this parameter, wherein the transition matrix comprises for the plurality of discrete value states of each parameter the probabilities to switch from one of the discrete value states to another of the discrete value states within a certain time period;

determining, in the apparatus, the probabilities of the discrete value states of the parameters on the basis of the received values of the parameters; and receiving, in the apparatus, the conditional probabilities of the discrete value states of the parameters given the corresponding single malfunction;

wherein the predicting of the malfunction of the unit comprises determining the probability of the malfunction of each component, wherein the determining of the probability of the malfunction of each component comprises the following steps:

receiving, in the apparatus, a measurement of the current value of the at least one parameter of the at least one single malfunction of the component, and determining, in the apparatus, the current discrete value state of the at least one parameter of the component, or receiving, in the apparatus, the current discrete value state of the at least one parameter of the component; and determining the probability of each single malfunction of the component based on the current discrete value state of the at least one parameter of the single malfunction, based on the transition matrix of the at least one parameter of the single malfunction, based on the probability for the single malfunction of the component, based on the probabilities of the discrete value states of the at least one parameter of the single malfunction and based on the conditional probability of the discrete value states of the at least one parameter of the single malfunction given the corresponding single malfunction;

wherein the maintenance of the unit comprises prolonging the lifespan of the unit by removing the cause of the malfunction based on the determined probability of the malfunction of the corresponding component.

2. Method according to claim 1,
wherein the configuring of the apparatus comprises the step of determining, in the apparatus, the conditional probability distributions for each single malfunction of each component given the corresponding discrete value states of the parameter used for determining this single malfunction based on the probabilities of the discrete value states of this parameter, on the probability of the single malfunction and on the conditional probabilities of the discrete value states of the parameters given the corresponding single malfunction
wherein the step of determining the probability of each single malfunction of the component is based on the current discrete value state of the at least one parameter of the single malfunction, on the transition matrix of the at least one parameter of the single malfunction and on the conditional probability distribution for the single malfunction given the corresponding discrete value states of the at least one parameter used for determining this single malfunction.

3. Method according to claim 2, wherein the determining of the probability of each single malfunction of each component comprises the following steps:
determining, in the apparatus, a conditional probability distribution for the at least one parameter of the single malfunction for a future point in time given the current discrete value state of the at least one parameter based on the current value state of the at least one parameter of the single malfunction and based on the transition matrix of the at least one parameter of the single malfunction; and
determining a conditional probability for the single malfunction at the future point in time given the current discrete value state of the at least one parameter
based on the conditional probability distribution of the parameter for the future point in time given the current discrete value state of the at least one parameter and
based on the conditional probability distribution for the single malfunction given the corresponding discrete value state of the at least one parameter.

4. Method according to claim 1, wherein the step of receiving probabilities for the single malfunctions of each component comprises for each component:
receiving, in the apparatus, values indicating the relative probabilities of the single malfunctions of the corresponding component;
receiving, in the apparatus, a probability for a malfunction of the corresponding component caused by all of the single malfunctions;
determining, in the apparatus, the absolute probabilities of the single malfunctions of the corresponding component on the basis of the relative probabilities and the probability for the malfunction of the corresponding component caused by all of the single malfunctions.

5. Method according to claim 4, wherein the relative probabilities are each indicated by a scale between a minimum and a maximum and the absolute probabilities of the single malfunctions are determined by rescaling the relative probabilities so that the sum of all relative probabilities yields the probability for having a malfunction of the corresponding component.

6. Method according to claim 4, wherein for each single malfunction of the corresponding component additionally the relative impact of the single malfunction is received.

7. Method according to claim 1, wherein the step of receiving the conditional probabilities of the discrete value states of the parameters given the corresponding single malfunction comprises for each single malfunction of each component:
receiving, in the apparatus, probabilities that the parameter indicating the single malfunction is in a number of parameter intervals when the single malfunction occurs, wherein the number of parameter intervals is smaller than the number of discrete value states of this parameter, and
determining, in the apparatus, the conditional probabilities of the number of discrete value states of the parameters given the corresponding single malfunction, on the basis of the received conditional probabilities of the number of parameter intervals of the parameters given the corresponding single malfunction.

8. Method according to claim 7, wherein the number of parameter intervals is smaller than or equal to five.

9. Method according to claim 8, comprising the step of determining, in the apparatus, a wear measuring quantity for each component.

10. Method according to claim 7, wherein the number of parameter intervals is four.

11. Method according to claim 1, wherein
one of the components is a gas turbine, and the single malfunction of the gas turbine is one of a bearing defect, a compressor defect, a flow malfunction, a turbine malfunction, or an output malfunction, and the parameter for predicting the single malfunction of the gas turbine is temperature, lubricant condition in the bearings or in an oil tank, shaft or casing vibration, pressure of the gas in the turbine, electric output of a generator coupled with the turbine, ambient air condition or humidity, or a combination thereof; and/or
one of the components is a transformer, and the single malfunction of the transformer is one of an insulation defect or a cooling system defect of the transformer, and the parameter for predicting the single malfunction of the transformer is one or a combination of temperature of coils of the transformer, vibrations of cooling fans of the transformer, a condition of the oil surrounding the coils of the transformer; or
one of the components is a diesel engine, and the single malfunction of the diesel engine is one of bearing defect or turbo charger defect, and the parameter for predicting the single malfunction of the diesel engine is one or a combination of temperature, vibrations, lubricant condition, outlet pressure of the compressor and fuel analysis.

12. Method according to claim 1, further comprising determining the probability of malfunction of the unit based on the dependency on the components in the unit, and combining the probabilities of malfunction of one or more units to determine a malfunction probability of a fleet of the units.

13. Method according to claim 1, further comprising determining components to be replaced during a scheduled maintenance of an industrial asset.

14. Method according to claim 1, further comprising measuring values of the parameters of the components of the unit by one or more sensors.

15. Non-transitory computer-readable medium storing a program comprising instructions configured to perform the following steps when executed on a processor:
receiving, in the processor, information about components of the unit, wherein the components are mechanical or electrical components of the unit,
receiving, in the processor, single malfunctions for each of the components,
receiving, in the processor, probabilities for the single malfunctions of each component,
receiving, in the processor, at least one parameter of each component for each single malfunction of this component,
receiving, in the processor, current values of the parameters, each current value of the parameters being either a current measurement or a current discrete value state,
dividing, in the processor, each parameter into a plurality of discrete value states,
receiving, in the processor, values of the parameters,
determining, in the processor, a transition matrix for each parameter on the basis of the received values of this parameter, wherein the transition matrix comprises for the plurality of discrete value states of each parameter the probabilities to switch from one of the discrete value states to another of the discrete value states within a certain time period;
determining, in the processor, the probabilities of the discrete value states of the parameters on the basis of the received values of the parameters; and
receiving, in the processor, the conditional probabilities of the discrete value states of the parameters given the corresponding single malfunction;
if at least one current value of the parameters is a current measurement, a current discrete value state section for determining the current discrete value state of each current measurement;
a prediction section for predicting of the malfunction of the unit by determining the probability of each single malfunction of each component based on the current discrete value state of the at least one parameter of the single malfunction, based on the transition matrix of the at least one parameter of the single malfunction, based on the probability for the single malfunction of the component, based on the probabilities of the discrete value states of the at least one parameter of the single malfunction and based on the conditional probability of the discrete value states of the at least one parameter of the single malfunction given the corresponding single malfunction.

16. Apparatus for configuring a prediction of a malfunction of a unit and for predicting the malfunction of the unit, the apparatus comprising, a processor, wherein the processor comprises:
a receiving section configured to receive:
information about components of the unit,
single malfunctions for each component,
values for determining probabilities for the single malfunctions of each component,
at least one parameter of each component for each single malfunction of this component,
measurements of the parameters;
values for determining the conditional probabilities of the discrete value states of the parameters given the corresponding single malfunction;
current values of the parameters, each current value of the parameters being either a current measurement or a current discrete value state,
a dividing section for dividing the parameter range of each parameter into a plurality of discrete value states,
a transition matrix section for determining a transition matrix for each parameter on the basis of the measurements of this parameter, wherein the transition matrix comprises for the plurality of discrete value states of each parameter the probabilities to switch from one to another of the discrete value states within a certain time period;
a first conditional probability section configured to determine the conditional probabilities of the discrete value states of the parameters given the corresponding single malfunction, on the basis of the values for determining the conditional probabilities of the discrete value states of the parameters given the corresponding single malfunction; and
a discrete value state probability section for determining the probabilities of the discrete value states of the parameters on the basis of the measurements of the parameters; and
a malfunction probability section for determining the probabilities of the single malfunctions, on the basis of the values for determining probabilities for the single malfunctions of each component;
if at least one current value of the parameters is a current measurement, a current discrete value state section for determining the current discrete value state of each current measurement;
a prediction section for predicting of the malfunction of the unit by determining the probability of each single malfunction of each component based on the current discrete value state of the at least one parameter of the single malfunction, based on the transition matrix of the at least one parameter of the single malfunction, based on the probability for the single malfunction of the component, based on the probabilities of the discrete value states of the at least one parameter of the single malfunction and based on the conditional probability of the discrete value states of the at least one parameter of the single malfunction given the corresponding single malfunction.

* * * * *

UNITED STATES PATENT AND TRADEMARK OFFICE
CERTIFICATE OF CORRECTION

PATENT NO. : 10,685,288 B2
APPLICATION NO. : 15/504717
DATED : June 16, 2020
INVENTOR(S) : Frank Kirschnick Page 1 of 1

It is certified that error appears in the above-identified patent and that said Letters Patent is hereby corrected as shown below:

In the Specification

Column 14, Line 67: please remove "bearings 4.1 (V1)" and replace it with -- bearings 34.1 (V1) --.

Column 15, Line 17: please remove "M1 to M11 stays" and replace it with -- M1 to M10 stays --.

Column 19, Line 23: please remove "dP(a(T))/dt=D(a)d2p(a(t))/da2" and replace it with
-- $dP(a(t))/dt=D(a)d^2P(a(t))/da^2$ --.

Signed and Sealed this
Twentieth Day of October, 2020

Andrei Iancu
*Director of the United States Patent and Trademark Office*